United States Patent Office 3,357,814
Patented Dec. 12, 1967

3,357,814
ARTIFICIAL SOIL PREPARED BY ABSORBING PLANT NUTRIENTS INTO EXFOLIATED VERMICULITE
John G. Getsinger, 420 Eason St., Florence, Ala. 35630
No Drawing. Filed Aug. 10, 1964, Ser. No. 388,712
4 Claims. (Cl. 71—31)

ABSTRACT OF THE DISCLOSURE

An artificial soil comprising a mixture of expanded exfoliated vermiculite and plant food elements to provide a growing medium for house plants. The plant food elements are prepared in solution-slurry in proportions and amounts most suitable for plant growth, but slightly in excess of solubility. The solution-slurry is heated to boiling and the vermiculite added. The heat from the solution-slurry suddenly drives the air from, and causes the liquid and excess solids to be pulled into and fill, the pores of the vermiculite. Water is removed by drying, and the product when used as a growing medium with addition of water releases plant food slowly as required by the plant.

---

This invention relates to a substitute for natural soil as a plant growing medium, and it deals more particularly with an artificial soil and its method of production Obtaining natural soil for growing house plants is a difficult procedure. Natural soils vary in composition and consistency, and unless one is skilled in recognizing differences in soils and in requirements of plants much guesswork attends the selection of soil for a particular plant. Moreover, the availability of the soil often dictates the selection. Then the soil is modified by the addition of fertilizers and conditioners and more guesswork enters into obtaining the final mixture in the pot. Furthermore, natural soils contain living organisms such as bacteria, fungi, and parasites which may attack the plant and inflict it with disease, reducing its ornamental value or killing it altogether. Therefore, many natural soils must be sterilized, at additional expense and trouble, before they are fit to be used for potting plants. Also, it is known that natural soils render available plant food unavailable to plants by "fixing" them physically or chemically in an unavailable form. Examples of elements so "fixed" are phosphorus, iron, and zinc. Also, by biological and chemical action in natural soils nitrogen in nitrate salts is converted to gaseous oxides of nitrogen and to gaseous elemental nitrogen. These gaseous forms of nitrogen are lost to the atmosphere, and therefore are lost as nourishment for the plant.

The amount of water available to plants in some natural soils is small; the difference in water content of the soil between a saturated content and a content causing wilting of the plants is small. This necessitates frequent watering of a plant with small quantities of water, for neither a saturated soil nor wilting is good for the plant. Close and confining attention to the plant in natural soil is thus required.

It is an object of this invention to produce an artificial soil that is uniformly balanced in the nutrient needs of the plant so that guesswork is removed about the response of plants to the soil. Another object is to supply all of the nutrients in the artificial soil so that only water needs to be added; in other words, no additional fertilizer is needed. Another object is to supply the nutrients in a form so that they are long-lasting and need not be replenished for a period of time amounting to months or years. Another object is to make an artificial soil that is inherently free of disease-causing organisms that might injure plants. Another object is to produce a soil that requires less frequent watering than natural soil.

The base of the artificial soil is expanded vermiculite. Expanded vermiculite is a micaceous hydrous silicate which has been heated to a temperature high enough to make it porous so that a cubic foot of the material of minus 4 mesh in particle size weighs about 4 to 5 pounds. Vermiculite is well known as a soil conditioner and as an additive to fertilizer.

In my process, I impregnate vermiculite with a fertilizer solution-slurry of certain fertilizer materials added to water as hereinafter described. The water is removed by evaporation from the mixture leaving the fertilizer solids inside the pores of the particles of vermiculite.

The materials used in making up the solution-slurry and the composition of the mixture are described in Table I. The mixture is referred to as a solution-slurry because some of the ingredients are present in amounts in excess of their solubility. The ingredients shown in the table supply the following necessary plant nutrient elements: nitrogen, phosphorus, potassium, calcium, sulfur, magnesium, iron, manganese, boron, zinc, and copper. The ingredients or forms in which these elements are described in Table I are only the most convenient or economical, and the elements might be supplied in other forms. For instance, nitrogen might be supplied as calcium nitrate, ammonium nitrate, sodium nitrate, ammonium phosphate, or any other ammonium or nitrate fertilizer salt. Phosphorus might be supplied as triple superphosphate, food-grade monocalcium phosphate, potassium phosphate, or any other phosphate fertilizer salt. Potassium might be supplied as potassium chloride, potassium sulfate, or any other potassium fertilizer salt. Calcium is supplied incidentally with the superphosphates and is added as calcium sulfate but might be supplemented by addition as calcium chloride. Sulfur is supplied incidentally with any of the above-named sulfur-containing materials including those in Table I. Magnesium might be supplied as magnesium chloride. Iron might be supplied as the tartrate, citrate, chloride, or oxide. Manganese, copper, and zinc might all be supplied as the chlorides. Boron can be supplied as borax (sodium borate), or other soluble boron-containing salt.

In producing the artificial soil the solution-slurry is prepared in concentrations as shown in Table I. It is heated to boiling. Two volumes of expanded vermiculite are added to one volume of the solution-slurry while mixing and boiling. The heat of the liquid drives the air out of the pores of the vermiculite, impregnating it with the solution-slurry. The saturated vermiculite is then placed in a dryer and heated at temperatures up to 400° F. However, temperatures of 250° to 325° F. are preferred. The mixture is heated until the impregnated vermiculite is dry. The resulting material is the artificial soil product.

The artificial soil so produced fulfills the objectives stated earlier. Apparently the plant nutrients are held by the artificial soil in a manner that prevents their killing the plants by a high concentration of salts. Subsequently the nutrients are released by the artificial soil as the plant requires them. The vermiculite in the artificial soil does not compete with the plant for the nutrients and so eventually releases all of the nutrients, thus making very efficient use of the nutrients.

The artificial soil may also be saturated with water without harm to the plant. As the water is used the plant does not wilt until substantially all of the moisture has been removed from the artificial soil. This allows for longer periods between required waterings.

Artificial soil produced by the method described above has been tested in use with many plants in various ways. Seeds planted in the artificial soil showed excellent germination counts. Seeds tested were: marigold, zinnias, coleus, and petunias. In most tests the germination counts were 100 percent. The seedlings grew rapidly and the plants were apparently healthy and vigorous. Cuttings of plants that have been rooted in the artificial soil are: coleus, African violets, begonias, sultanas, geraniums, azaleas, and philodendron. The plants rooted rapidly with almost 100 percent success. Because the rooting medium is also the growing medium, there is no necessity for transplanting. Therefore, the early rate of growth is rapid and uninterrupted. However, transplanting of seedlings or plants can be easily accomplished. Transplantation of African violets, coleus, marigolds, philodendron, geraniums, zinnias, and begonias showed that the loose, porous nature of the artificial soil made the mechanics of transplanting easy. Furthermore, there was no apparent shock to the plants, caused by transplanting since the roots received a minimum of disturbance due to the loose nature of the artificial soil.

Tests showed that a solution slurry that was concentrated enough in nutrient salts to kill a plant when its roots were exposed to the solution, would act as an excellent growing medium when this same solution was used to impregnate vermiculite and then dried to make artificial soil. When the artificial soil was used as a growing medium approximately the same amount of water was added back to the artificial soil as had been removed from the original solution slurry by drying. The apparent explanation for the artificial soil nourishing the plant, whereas the solution slurry killed the plant, lies in a synergistic combination of the vermiculite and the plant nutrients. Apparently, the vermiculite holds back part of the salts initially so that the solution produced by adding water in the artificial soil never reaches the strength of the original solution slurry. As the growing plant reduces the nutrient content of the solution produced by adding water more nutrients are related from the vermiculite, maintaining a favorable concentration of this solution. This holding back effect is further enhanced by the use of a solution-slurry as opposed to a mere solution, in that most of the elements present in excess of their solubility and substantially filling the pores of the vermiculite tend to present a condition in which the nutrients are at least initially partially insoluble, with simultaneous precipitation back into the pores. The amount of nutrients going into solution is that required by the plant, gauged by that amount drawn from the solution by the plant.

Example 1

A solution (the word "solution" as used herein referring to a solution-slurry) (designated as solution "A") was made up as follows: To 900 cc. of water was added 0.8 gram of epsom salt (magnesium sulfate), 1.1 grams of ordinary superphosphate (20% $P_2O_5$). 0.8 gram of potassium nitrate, and 0.9 gram of gypsum (calcium sulfate dihydrate). In addition, the following method was used to add other materials: Five grams of hydrated ferrous sulfate was dissolved in 1 liter of water giving 1 gram of iron per liter; 0.5 cc. of this solution was added to soltuion A. One grame of hydrated manganese sulfate was dissolved in 1 liter of water, giving 0.25 gram of manganese per liter; 0.8 cc. of this solution was added to solution A. One and four-tenths grams of boric acid was dissolved in 1 liter of water, giving 0.25 gram of boron per liter; 0.8 cc. of this solution was added to solution A. Eleven-hundredths gram of zinc sulfate was dissolved in 2.5 liters of water, giving 0.01 gram of zinc per liter; two cc. of this solution was added to solution A. One-tenth gram of hydrated copper sulfate was dissolved in 2.5 liters of water, giving 0.01 gram of copper per liter; two cc. of this solution was added to solution A. Solution A was made up to 1 liter by the addition of water.

Solution A was heated to boiling. Two liters of minus 4-mesh expanded vermiculite (150 grams) was added to the solution and mixed with a spoon until the vermiculite absorbed the solution. The mixture then was dried in an oven at 250° F. for 8 hours.

Two flower pots that were 100 cc. in volume were filled with the dried mixture (designated as artificial soil). The artificial soil was saturated with water and 4 marigold seeds were planted in each pot. After 3 days, four sprouts were noted in each pot. Ten days after planting, three plants were removed from each pot. Six and a half weeks after planting the remaining plants bloomed. The plants survived and bloomed for 9½ months; only water was added during this time.

Example 2

A flower pot 100 cc. in volume was filled with plain, untreated, minus 4-mesh, expanded vermiculite. The vermiculite was saturated with water and 4 marigold seeds were planted. After 3 days, four sprouts were noted. Ten days after planting, three plants were removed. The remaining plant survived for almost 4 months but did not grow much and did not bloom. Only water was added during this time.

Example 3

A solution (the word "solution" as used herein referring to a solution-slurry) (designated as solution "B") was made up as follows: To 900 cc. of water was added 6.4 grams of magnesium sulfate, 8.8 grams of superphosphate (20% $P_2O_5$), 6.4 grams of potassium nitrate, and 7.2 grams of gypsum. In addition, the following method was used to add micronutrient materials: Five grams of hydrated ferrous sulfate was dissolved in 1 liter of water giving 1 gram of iron per liter. Fifteen cc. of this solution was added to solution B. Four grams of hydrated manganese sulfate was dissolved in 1 liter of water giving 1 gram of manganese per liter; 8 cc. of this solution was added to solution B. Five and seven-tenths grams of boric acid was dissolved in 1 liter of water giving 1 gram of boron per liter; 8 cc. of this solution was added to solution B. Four and four-tenths grams of hydrated zinc sulfate was dissolved in 1 liter of water giving 1 gram of zinc per liter; 4 cc. of this solution was added to solution B. Three and nine-tenths grams of hydrated copper sulfate was dissolved in 1 liter of water giving 1 gram of copper per liter; 4 cc. of this solution was added to solution B. Solution B was made up to 1 liter by the addition of water.

Solution B was heated to boiling. Two liters of minus 4-mesh expanded vermiculite (150 grams) was added to the solution and mixed with a spoon until the vermiculite absorbed the solution. The mixture was then dried in an oven at 300° F. for 7 hours.

Two flower pots that were 100 cc. in volume were filled with the artificial soil made from solution B. The artificial soil was saturated with water and 4 marigold seeds were planted in each pot. After 3 to 6 days all of the seed sprouted. After 12 days one plant died. The rest of the plants except one per pot were removed. Seven and a half to eight weeks after planting the plants in both pots bloomed. The plants survived and bloomed for 9 months; only water was added during this time.

Example 4

A solution (the word "solution" as used herein referring to a solution slurry) (designated as solution "C") was made up as follows: To 900 cc. of water was added 3.2 grams of magnesium sulfate, 4.4 grams of ordinary superphosphate (20% $P_2O_5$), 3.2 grams of potassium nitrate, and 3.6 grams of gypsum. Five micronutrient solutions were made up as described in Example 3 so that the solutions contained 1 gram per liter, respectively, of iron, manganese, boron, zinc, and copper. Five cc. of iron solution, 3 cc. each of manganese and boron solutions, and 1 cc. each of zinc and copper solutions were added to solution C. Solution C was made up to 1 liter by adding water.

Solution C was heated to boiling. Two liters of minus 4-mesh expanded vermiculite (150 grams) was added to the solution and mixed with a spoon until the vermiculite absorbed the solution. The mixture was then dried in an oven at 325° F. for 6 hours.

Two flower pots 100 cc. in volume were filled with the artificial soil made from solution C. The artificial soil was saturated with water and 4 marigold seeds were planted in each pot. After 3 days all of the seed sprouted. Ten days after planting, three plants were removed from each pot. Six and a half weeks after planting, the plants in both pots bloomed. The plants survived and bloomed for 9½ months; only water was added during this time.

TABLE I.—COMPOSITION OF SOLUTION-SLURRY FOR IMPREGNATING VERMICULITE

| Ingredient | Grams per liter | | |
|---|---|---|---|
| | Maximum | Minimum | Preferred |
| Epsom salt (magnesium sulfate) | 6.4 | 0.8 | 3.2 |
| Ordinary superphosphate (20% $P_2O_5$) | 8.8 | 1.1 | 4.4 |
| Potassium nitrate | 6.4 | 0.8 | 3.2 |
| Gypsum (calcium sulfate dihydrate) | 7.2 | 0.9 | 3.6 |

| Ingredient | Active Element | Parts per million of active element | | |
|---|---|---|---|---|
| | | Maximum | Minimum | Preferred |
| Ferrous sulfate | Iron | 15 | 0.5 | 5 |
| Manganese sulfate | Manganese | 8 | 0.2 | 3 |
| Boric acid | Boron | 8 | 0.2 | 3 |
| Zinc sulfate | Zinc | 4 | 0.02 | 1 |
| Copper sulfate | Copper | 4 | 0.02 | 1 |

The concentrations expressed above are, as shown in grams per liter for the macronutrient compounds and in parts per million of active element for the micronutrients. It is obvious that the active macronutrient elements for the above concentrations may be expressed in percent by weight:

TABLE II.—COMPOSITION OF SOLUTION-SLURRY FOR IMPREGNATING VERMICULITE (EXPRESSED IN PERCENT BY WEIGHT FOR MACRO NUTRIENT ELEMENTS FOR INGREDIENTS IN CONCENTRATIONS SHOWN IN TABLE I)

| Plant nutrient: | Range of composition (max. to min.), weight percent |
|---|---|
| N | 0.09–0.01 |
| $P_2O_5$ | 0.17–0.02 |
| $K_2O$ | 0.29–0.04 |
| Ca | 0.33–0.04 |
| S | 0.29–0.04 |
| Mg | 0.06–0.008 |

My invention should be distinguished in that it relates to an artificial soil, which is a self sustaining complete medium for the growth of plant life, rather than a fertilizer. The process and product of my invention relate to a soil containing all of the essential plant nutrient elements, requiring only the addition of water in the manner described to promote growth as in any natural soil. The present invention is distinguished from a ureaform fertilizer, first in that it is not a fertilizer, but a complete growing medium, and secondly, in that it does not involve the use of ureaform as a carrier or base for any of its essential plant nutrients. While there are many other distinguishing features it can readily be seen that on this basis alone the present invention is not anticipated by U.S. Patent No. 3,129,091, issued Apr. 14, 1964 to Adrian E. Buter.

The evaporation product of my solution-slurry is a dry mixture containing ammonium or nitrate salts, with trace elements, merely suspended in the dry form in the pores of the expanded vermiculite. The plant nutrients are thus eventually freely water soluble and are not bound up in any adhesive coating or semi-soluble resin form. These among other features, as well as the fact that my invention constitutes a soil rather than a fertilizer overcomes any possible anticipation by U.S. Patent No. 3,076,700 issued Feb. 5, 1963, to Victor A. Renner.

There is no urea or partially insoluble resinous material used in my invention, since the product is designed as a soil rather than a fertilizer.

From the foregoing it will be seen that this invention is one well adapted to obtain all of the ends and objects hereinbefore set forth, together with other advantages which are obvious and inherent in the combination. It will be understood that certain features and subcombinations are of utility and may be employed without reference to other features and subcombinations, as is contemplated by and is within the scope of the claims; and since various modifications of the process and product may be made without departing from the scope of the invention, all matter herein set forth is to be interpreted as illustrative and not in a limiting sense.

Having thus described my invention, I claim:

1. A process for the production of an artificial soil consisting of a dry mixture of separated particles of expanded exfoliated vermiculite having substantially uniformly dispersed in the pores thereof the essential macro and micro plant nutrients comprising the steps of
   (1) introducing particles of expanded exfoliated vermiculite into a boiling slurry of the essential macro and micro plant nutrients,
   (2) simultaneously maintaining the resulting mixture of said slurry of said plant nutrients and said introduced particles of expanded exfoliated vermiculite at the boiling point of said mixture and agitating said resulting mixture until said slurry of said plant nutrients is substantially absorbed into and filling the internal pores of said expanded exfoliated vermiculite, and
   (3) evaporating water from the resulting plant nutrient impregnated vermiculite product, said product further characterized by the fact that said slurry of the essential macro and micro plant nutrients is selected from the group consisting of the following plant nutrients and mixtures thereof:

| Plant nutrient: | | Range of composition (maximum to minimum) |
|---|---|---|
| N | weight percent | 0.09–0.01 |
| $P_2O_5$ | do | 0.17–0.02 |
| $K_2O$ | do | 0.29–0.04 |
| Ca | do | 0.33–0.04 |
| S | do | 0.29–0.04 |
| Mg | do | 0.06–0.008 |
| Fe | p.p.m. | 15–0.5 |
| Mn | p.p.m. | 8–0.2 |
| Bo | p.p.m. | 8–0.2 |
| Zn | p.p.m. | 4–0.02 |
| Cu | p.p.m. | 4–0.02 |

2. The process of claim 1, wherein the volume of expanded particles of exfoliated vermiculite added to said slurry of essential plant nutrients is in the ratio of 2:1 of said slurry.

3. The process of claim 1, wherein said macro and micro nutrients are selected as follows; macro nutrients from the group consisting of magnesium sulfate, ordinary super phosphate (20% $P_2O_5$), potassium nitrate, and gypsum (calcium sulfate dihydrate); and said micro nutrients from the group consisting of ferrous sulfate, manganese sulfate, boric acid, zinc sulfate and copper sulfate.

4. New improved artificial soil aggregates suitable for promoting and maintaining survival of house plants which consists essentially of
   (1) a substrate of particles of expanded exfoliated vermiculite, (2) a solid dry coating of plant nutrients over substantially all of the surfaces of said substrate and substantially impregnating and filling the internal pores of said substrate, said coating substantially free of all water such that said artificial soil aggregates are substantially dry and
(3) said artificial soil aggregates further characterized by the fact that the concentration of said solid, dry coating of plant nutrients including that impregnating the internal pores of said substrate is initially at least partially insoluble in relation to the soil solution produced upon the subsequent addition of water to said soil aggregates when used in their intended environment; and said partial insolubility of said coating being inversely dependent and proportional to the quantity of said soil solution produced.

References Cited
UNITED STATES PATENTS
2,791,496   5/1957   Rice _____ 71—64

DONALL H. SYLVESTER, *Primary Examiner.*

R. BAJEFSKY, *Assistant Examiner.*

UNITED STATES PATENT OFFICE
CERTIFICATE OF CORRECTION

Patent No. 3,357,814                          December 12, 1967

John G. Getsinger

It is certified that error appears in the above identified patent and that said Letters Patent are hereby corrected as shown below:

In the heading to the printed specification, line 5, "John G. Getsinger, 420 Eason St., Florence, Ala. 35630" should read -- John G. Getsinger, Florence, Ala., assignor to Tennessee Valley Authority, a corporation of the United States --. Column 3, line 35, "related" should read -- released --.

Signed and sealed this 12th day of August 1969.

(SEAL)
Attest:

Edward M. Fletcher, Jr.                        WILLIAM E. SCHUYLER, JR.

Attesting Officer                                      Commissioner of Patents